March 2, 1954
H. A. GRAHAM
2,670,688
ROTARY FLUID DISPLACEMENT MECHANISM
Filed Feb. 20, 1952
10 Sheets—Sheet 1
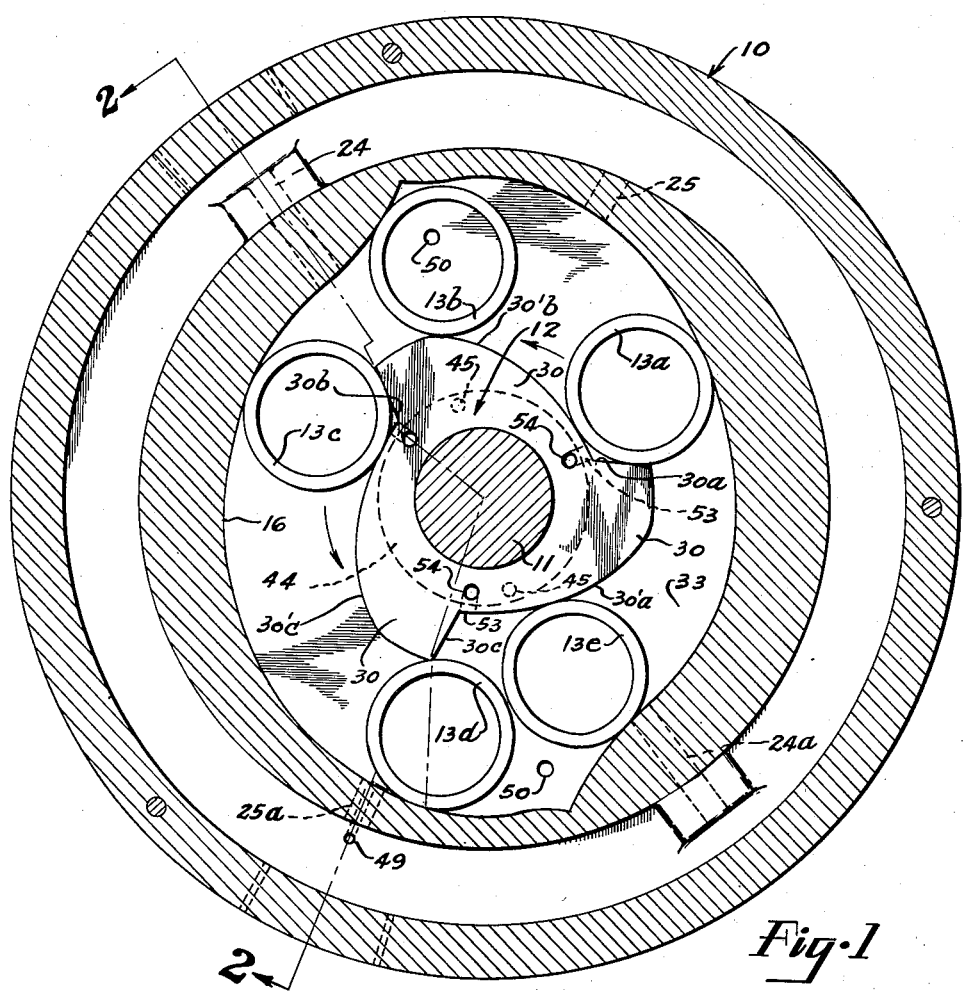
Fig·1
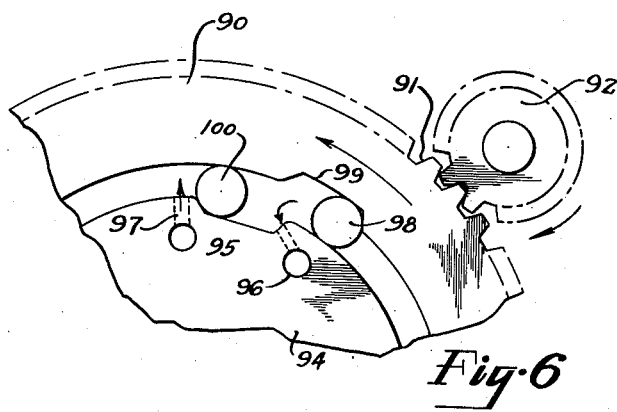
Fig·6
INVENTOR.
HAROLD A. GRAHAM
BY
Albert R. Golrick
ATTORNEY March 2, 1954

H. A. GRAHAM 2,670,688

ROTARY FLUID DISPLACEMENT MECHANISM

Filed Feb. 20, 1952

INVENTOR.
HAROLD A. GRAHAM

BY Albert R. Golrick

ATTORNEY

March 2, 1954

H. A. GRAHAM 2,670,688

ROTARY FLUID DISPLACEMENT MECHANISM

Filed Feb. 20, 1952

INVENTOR.
HAROLD A. GRAHAM

BY

Albert R. Gobrick

ATTORNEY

March 2, 1954

H. A. GRAHAM 2,670,688

ROTARY FLUID DISPLACEMENT MECHANISM

Filed Feb. 20, 1952

INVENTOR.
HAROLD A. GRAHAM

BY Albert R. Golrick

ATTORNEY

INVENTOR.
HAROLD A. GRAHAM
BY Albert R. Golrick
ATTORNEY

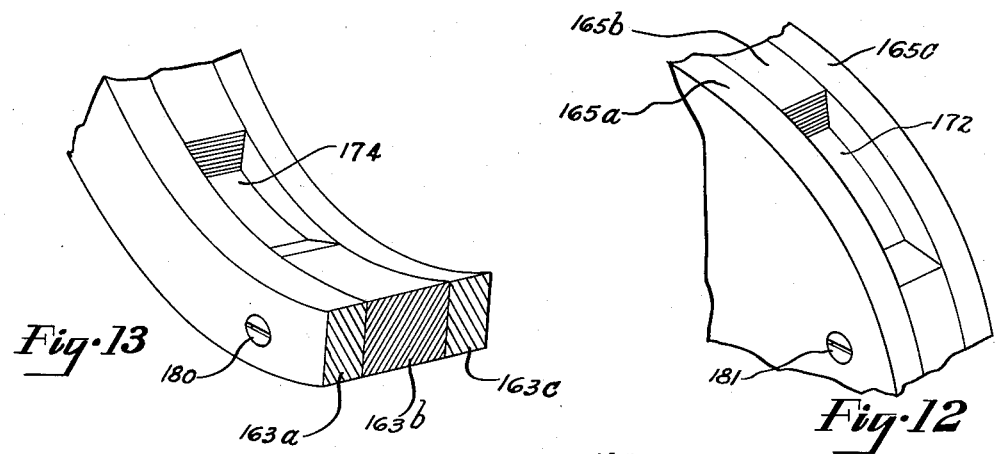
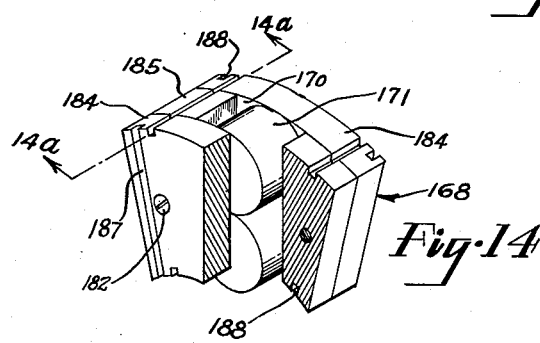
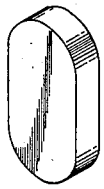
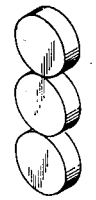
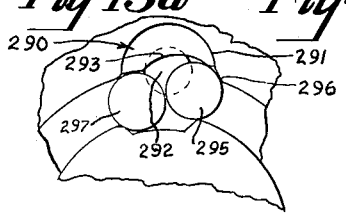
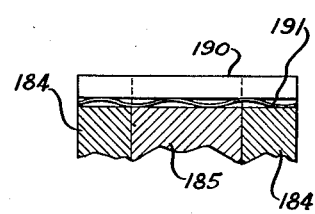

March 2, 1954

H. A. GRAHAM 2,670,688

ROTARY FLUID DISPLACEMENT MECHANISM

Filed Feb. 20, 1952

INVENTOR.
HAROLD A. GRAHAM
BY Albert R. Golrick
ATTORNEY

March 2, 1954  H. A. GRAHAM  2,670,688
ROTARY FLUID DISPLACEMENT MECHANISM
Filed Feb. 20, 1952

INVENTOR.
HAROLD A. GRAHAM
BY Albert R. Gobrick
ATTORNEY

March 2, 1954

H. A. GRAHAM 2,670,688

ROTARY FLUID DISPLACEMENT MECHANISM

Filed Feb. 20, 1952

INVENTOR.
HAROLD A. GRAHAM

BY Albert R. Gobrick

ATTORNEY

Patented Mar. 2, 1954

2,670,688

UNITED STATES PATENT OFFICE 2,670,688

ROTARY FLUID DISPLACEMENT MECHANISM

Harold A. Graham, Parma Heights, Ohio

Application February 20, 1952, Serial No. 272,681

17 Claims. (Cl. 103—129)

The present invention relates to a novel mechanism for use in rotary devices wherein fluid is either moved by the device or the fluid serves as a movant for the rotary mechanism. The nature of the invention is such, therefore, that it may be adapted for use as a fluid pump, a fluid motor and, with suitable fuel feed and ignition means, may serve also as an internal combustion engine.

In generalized terms, a structure embodying this invention operates on what herein is termed a mobile seal relay or exchange principle, by the provision of a plurality of relatively displaceable orbitally mobile seals between, for example, the outer and inner peripheries of two suitably contoured relatively rotatable surfaces—such as a rotor and casing—constituting walls of a fluid chamber. The mobile seals divide the fluid chamber into a plurality of smaller fluid chambers which vary in size under operatively varying conditions of relative seal positions as the rotor is turned. Each seal alternates in function as a stationary wall and as a moving wall in an individual fluid chamber of varying volume. The application of the principle of this invention will hereinafter be disclosed in various structural forms for use in pumps, fluid driven motors and internal combustion engines.

An object of the present invention is to provide a rotary mechanism of the character described wherein movable seals between two relatively rotatable parts provide a plurality of fluid chambers of operatively varying size.

Another object of the invention is to provide a mechanism for use in rotary fluid pumps, motors or like devices wherein seals are provided which may be self-compensating for wear in the device.

Another object of the invention is to provide a mechanism for use in pumps, motors or engines wherein critical tolerances are generally avoided in machining the working parts.

Another object is to provide a rotary mechanism of the character described wherein the seals between the relatively movable parts increase in effectiveness as the fluid pressures handled therein increase in magnitude.

Another object is to provide a rotary positive fluid displacement device which is capable of handling large fluid volumes at relatively high pressures.

With the above and other objects in view, which will be apparent from the detailed description which follows, the invention consists in certain novel features of construction and combination of parts which will be readily understood by those skilled in the art to which the invention appertains. In the drawings which illustrate an embodiment of the invention—

Fig. 1 is a cross section through a pump constructed according to the invention wherein rollers provide mobile seals, the section being taken perpendicularly to the axis of rotation along the line 1—1 of Fig. 2;

Fig. 6 is a fragmentary schematic view showing a form of the invention wherein the casing is rotated;

Fig. 12 is a fragmentary detail view of the spindle or carrier of Fig. 10;

Fig. 13 is a detail of the outer race of Fig. 8;

Fig. 14 is a detail of a sliding seal of Fig. 10;

Fig. 14a shows in detail sealing bars which may be used with a sliding block or piston such as shown in Fig. 14;

Figure 7:
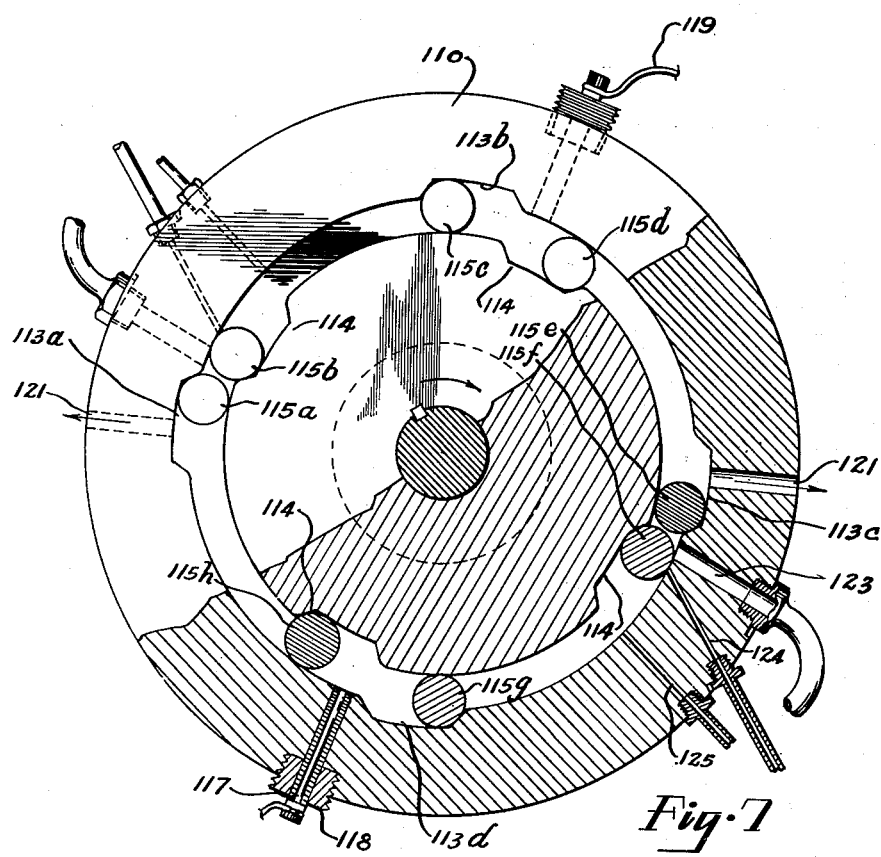
Fig. 7 is a schematic representation showing the mechanism and principles of this invention adapted to an internal combustion engine.
Figure 10:
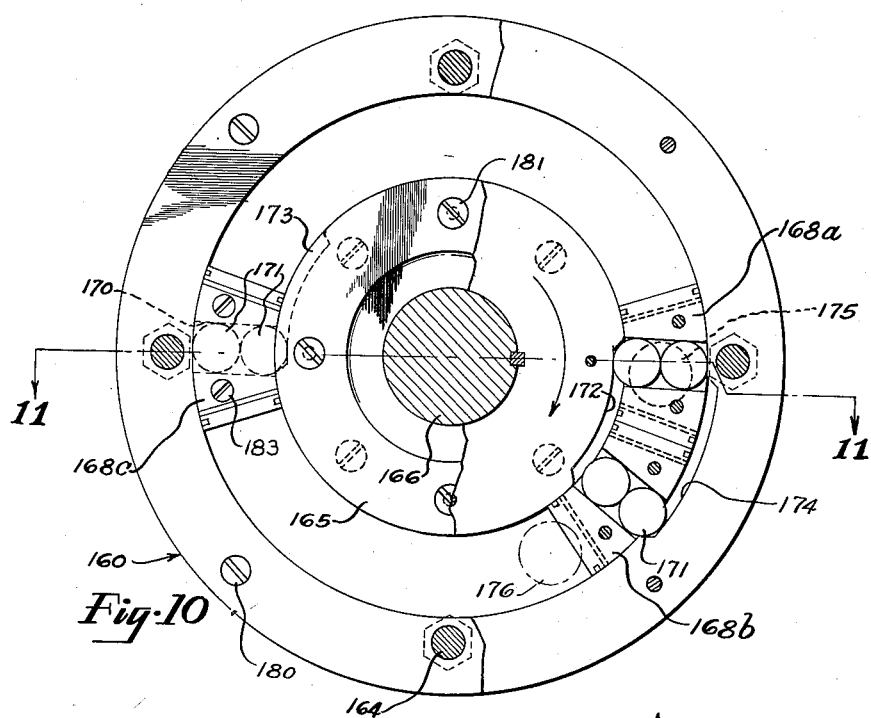
Fig. 10 is a cross section taken perpendicularly to the axis of a pump wherein is used another form of mobile seal in the form of a sliding block or piston.
Figure 16:
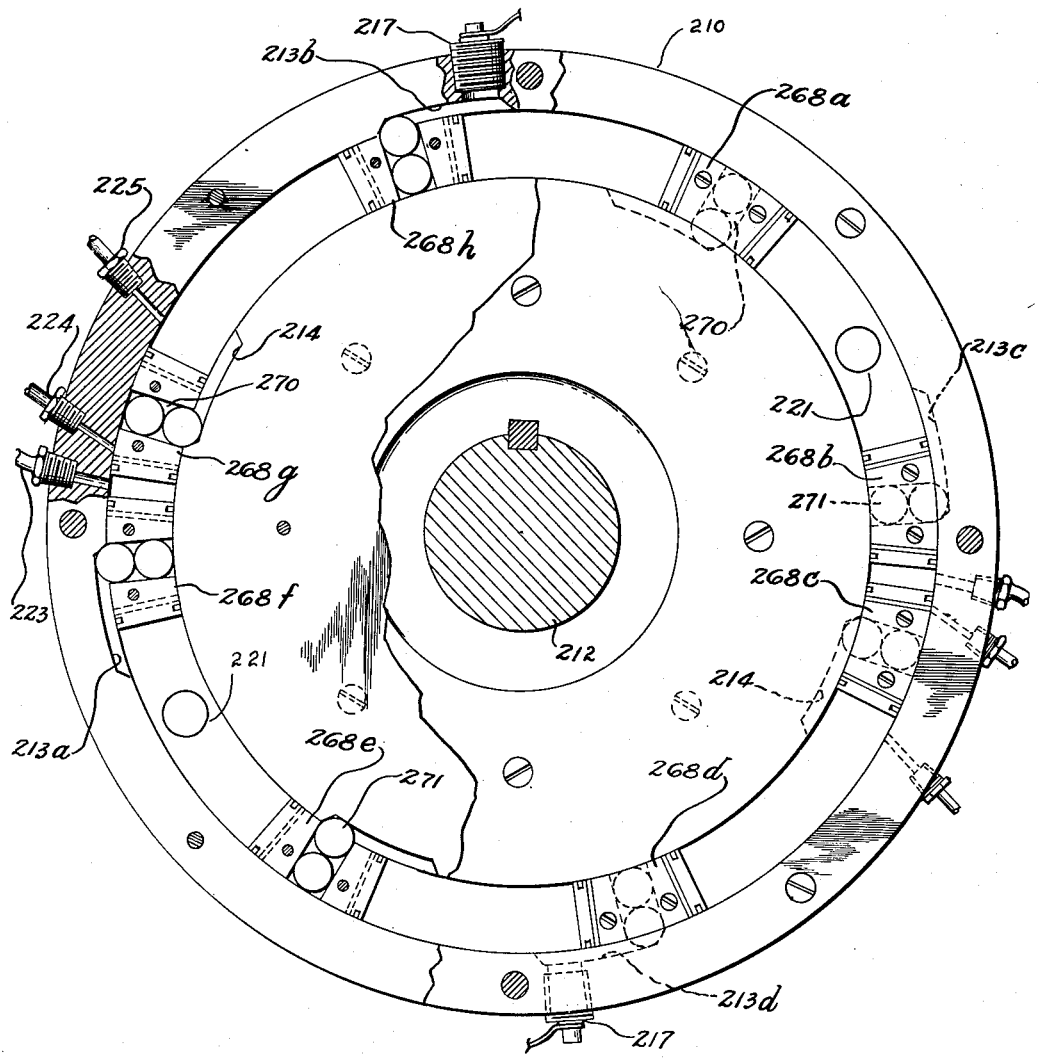
Figure 18:
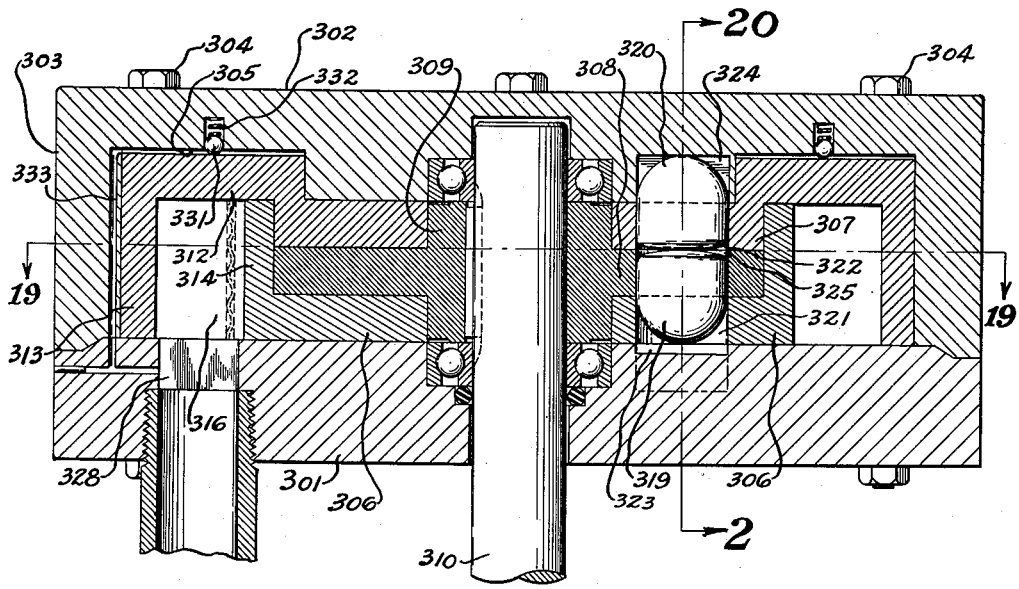
Figure 20:
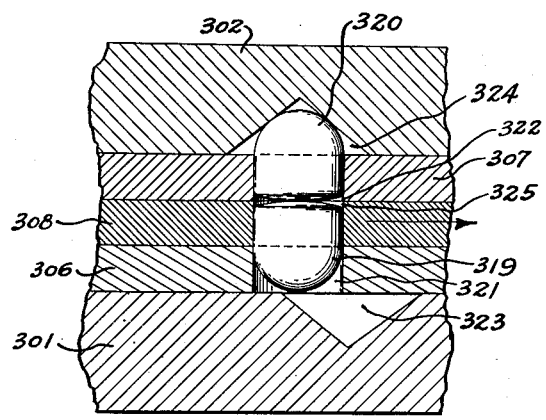
Figure 19:
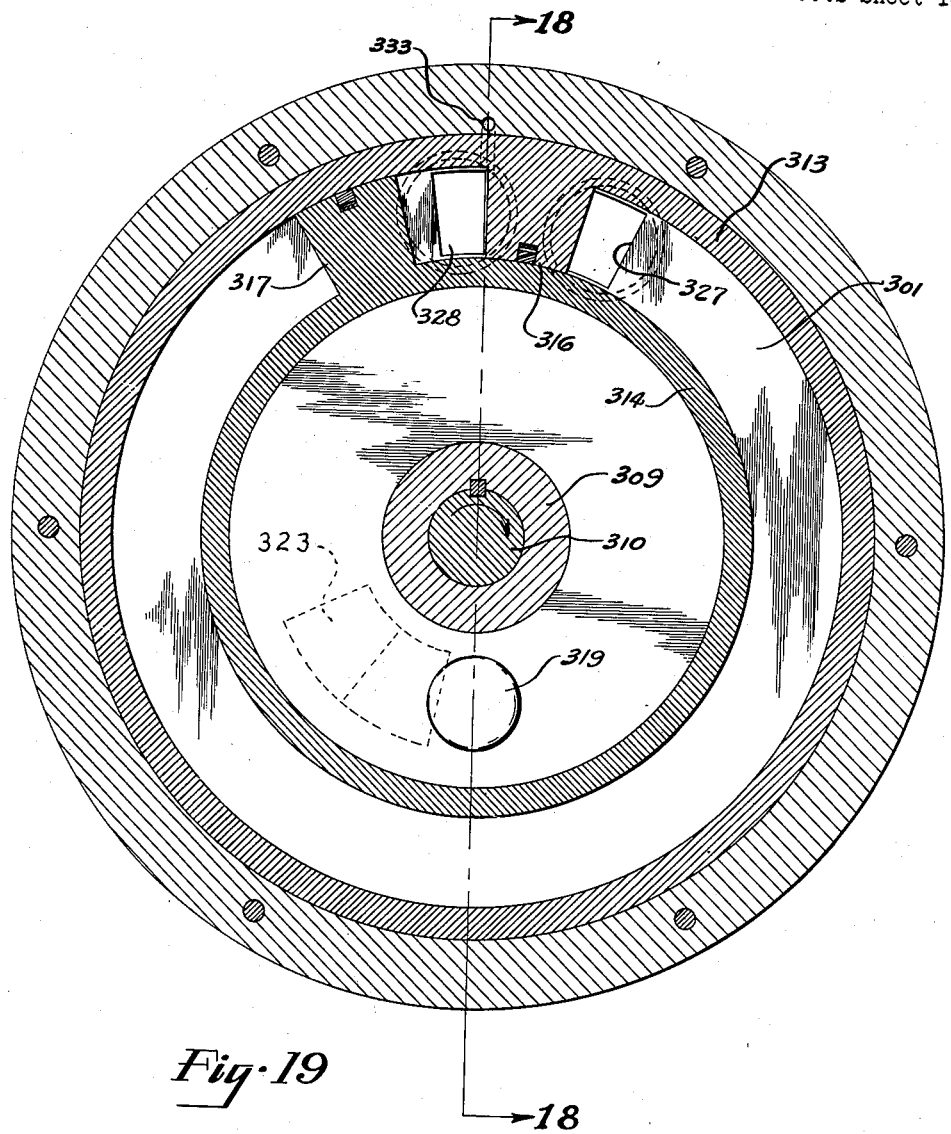

Fig. 15a, b, c, d, e shows various types of locking means which may be used with the type of seal shown in Fig. 10;

Fig. 16 is a schematic representation similar to Fig. 7, but utilizes the sliding block type of mobile seal;

Fig. 17 is another form of roller seal retaining formation for the outer race;

Fig. 18 is a vertical longitudinal section of a device utilizing a third form of seal and seal exchange structure;

Fig. 19 is a section taken along the line 19—19 of Fig. 18 but with certain rotatable parts displaced from the positions of Fig. 18; and Fig. 20 is a fragmentary circumferential section taken along the line 20—20 of Fig. 18.

Thus, Figs. 1–9 show devices utilizing mobile seals of the roller type, while Figs. 10–16 relate to devices employing the sliding block type seal.

Figure 2:
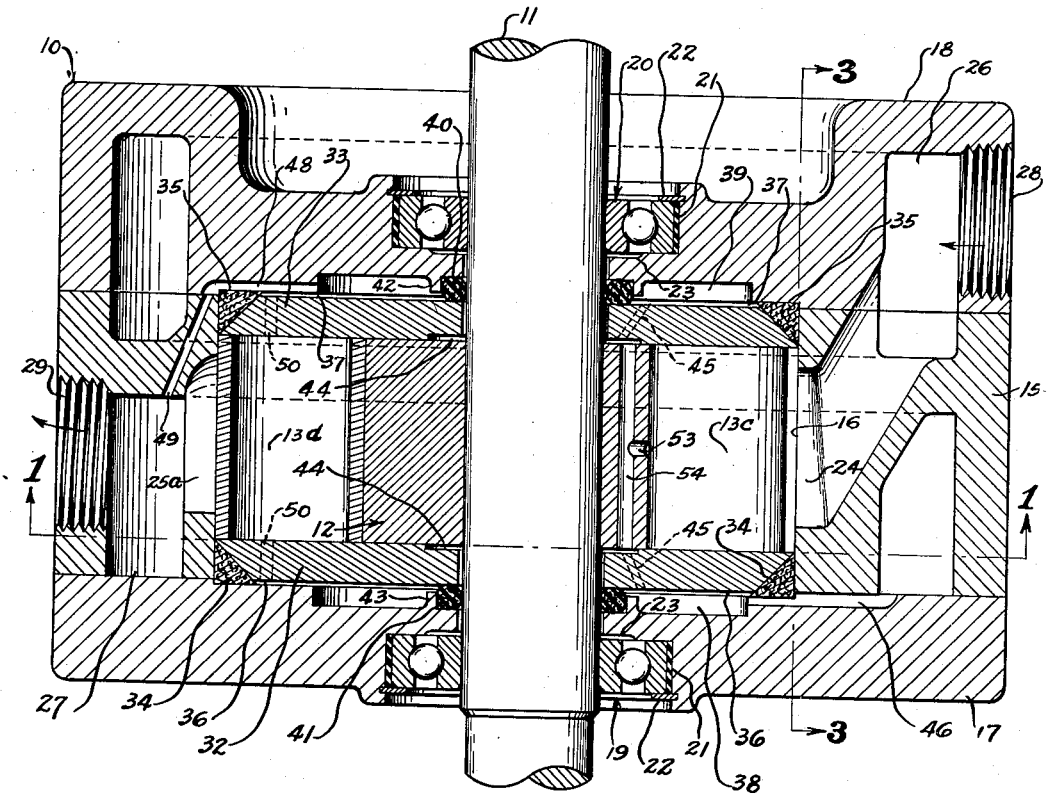
Fig. 2 is a sectional view taken along the line 2—2 of Fig. 1.
Figure 3:
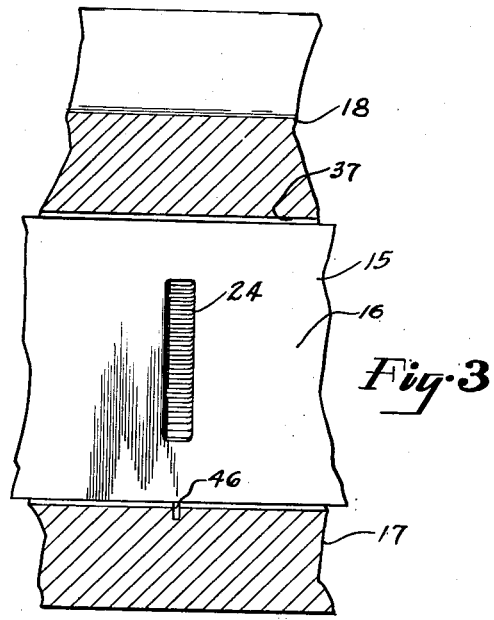
Fig. 3 is a fragmentary view taken along the line 3—3 of Fig. 2 to show in detail an inlet port of the device.

In Figs. 1, 2 and 3, there is shown a pump constructed according to this invention which includes a pump casing generally indicated 10, a pump shaft 11 on which there is mounted a spindle or rotor element 12, and right cylindrical roller elements 13a, 13b, 13c, 13d and 13e which are interposed between the rotor and casing. The roller elements may be hollow or solid. As here shown, the casing 10 comprises a hollow casing midsection 15 having a suitably contoured inner roller race surface 16 on which the rollers run, as hereinafter described, and two casing end plates 17 and 18. A liquid gasketing compound may be applied to abutting surfaces to seal the casing elements, or gaskets may be used. The casing may, of course, be formed in any way to include the operative elements as hereinafter described. Suitable shaft bearings 19 and 20 are provided in the pump cover plates 17 and 18 respectively, the outer races being retained in position by expanding snap rings 22. These bearings may be of the "floating" type, in which case there is provided for each a ring of resilient material 21 between the bearing and the cover plate, the cover plate then being recessed at 23 to allow clearance for the inner bearing race. When "floating" bearings are used, then suitable shaft clearance should be present at the shaft apertures in cover plates 17 and 18 and pressure plates 32 and 33.

Inlet and outlet ports 24—24a and 25—25a open inwardly through the casing to the roller operating space provided between the rotor 12 and the race surface 16, these ports communicating respectively with an annular inlet manifold 26 and annular outlet manifold 27 in the casing. The inlet manifold 26 is shown formed by matching annular channels provided in the cover plate 18 and the corresponding face of the midsection 15. The outlet manifold similarly is an annular channel formed in the midsection 15. Inlet and outlet piping connections 28 and 29, here shown threaded, are provided on the casing opening into the manifolds.

The rotor 12 is provided with three roller carriers 30 having forward faces or impelling shoulders 30a, 30b, 30c and rear surfaces 30'a, 30'b, and 30'c. The shoulders serve to move rollers 13 about in the pumping chamber constituted by the race wall 16, the rotor 12 and the pressure plates 32 and 33. These pressure plates have a beveled periphery generally conformed in shape to the race face 16 and are fitted into each end of the midsection 15 to provide side walls for the pumping chamber. Packing 34 and 35 for sealing the beveled periphery of each side plate 32 and 33 against the race face 16 is held in position by the respective cover plates.

As is seen more clearly in Fig. 2, the inner face of the cover plates are recessed at 36 and 37 to provide a slight clearance between the respective end plates near the outer periphery thereof, while the cover plates have deeper annular recesses 38 and 39 concentric to the shaft holes. O-ring seals 40 and 41 on the shaft 11 are disposed in recesses peripheral to the cover plate shaft holes, to form rotary seals between the rotor shaft 11 and corresponding pressure plates and cover plates.

The annular walls 42 and 43 of these O-ring recesses preferably extend beyond the center of the O-rings.

The inner face of each pressure plate may have a shallow circular recess 44 concentric to the shaft hole thereof to provide a chamber between each end of the rotor and the corresponding pressure plate. Vent channels 45 extend from these recesses 44 through the pressure plates to the chambers formed between the cover plates, pressure plates and the O-ring seals, which latter chambers in turn are in communication with the annular outlet manifold through vent channels in the pump casing, that is, through vent channel 46 from recess 38, and through channels 48 and 49 from recess 39. The side or pressure plates 32 and 33 are also provided with additional vent holes 50 near the port in the casing, the location of which is hereinafter described, so that the outer ends thereof open to the shallow recesses 36 and 37 and hence are in communication with the chambers between the pressure plates and cover plates. Though vents represented by dotted lines in Fig. 2 would not strictly be shown in Fig. 2 with the section taken along line 2—2, they are dotted in to show more clearly the intercommunication of the vent system. The function and purposes of these several vents will be later described relative to the operation of the pump.

Fig. 1 shows one manner of shaping rotor 12 and roller track or race 16 when two roller exchange stations and three carriers are used. Five rollers are provided—one for sealing each exchange station and one for each carrier on the rotor. On opposite sides of each station inlet and outlet ports 24 and 25, 24a and 25a open to the track face. In Fig. 3, a detail of the track face about an inlet port 24 but typical of the other port openings, the port is shown as having a shorter length than the rollers, so that the roller will have some continuous bearing surface in passing the port opening. Hence the midportion 15 of the casing should be of sufficient thickness to accommodate the length of the roller cylinders and the two pressure plates. Generally the dimensioning of the port openings is a compromise between demands of flow capacity and sealing function for a given gross pump size. Hence, usually a rectangular port opening is used, disposed lengthwise to the track width to minimize leakage as a roller passes the opening.

In the situation shown by Fig. 1 the following operative conditions prevail: The rotor 12, with its three roller carriers 30 disposed in threefold symmetry about the shaft axis, is carrying rollers 13a, 13c, 13d in a counter-clockwise direction, while rollers 13b and 13c form seals between the rotor surface and the track 16 behind the inlet ports 24a and 24 respectively. The roller 13a, as it is carried away from inlet port 24a, draws fluid into the expanding chamber extending between 13a and the comparatively stationary seal 13e. Simultaneously 13a is expelling, through outlet port 25, the fluid in the contracting chamber between 13a and the substantially stationary seal 13b, and the pressure developed thereby holds 13b in sealing contact with the radially inward slopes on the track surface 16 and the rear carrier surface 30'b. Roller 13c, which shortly before was in the present position of 13b, has been displaced (by an action similar to that occurring between 13d and 13e) and has been picked up by carrier face 30b. Thus as 13c is carried forward it also creates an expanding chamber with 13b for the influx of fluid through port 24, and a chamber with 13d from which fluid is expelled through outlet port 25a as 13c advances. The rollers 13d and 13e are in the relay or exchange process as the corresponding seal carrier and retaining formations transit each other. Roller 13d, still in driven contact with the edge of carrier face 30c, has already come into proximity with 13e and fluid pressure therebetween is effecting a displacement of the latter up the forward slopes from the exchange station which is permitted by the radially receding curve of the rear carrier surface 30'a. The fluid pressure developed between 13d and 13e serves also as a cushion keeping the rollers from tapping in the exchange process thereby furthering noiseless operation.

It may here be noted that there is a space of fluid not in direct communication with inlet or outlet ports 24a and 24b between the race 16, the pressure plates 32 and 33 and rollers 13d and 13e, and between the pressure plates, the rollers 13d and 13e, the rear carrier surface 30'a and the forward carrier face 30c. Since this space varies in volume, suitably placed vents are provided to prevent difficulties in the roller exchange process because of trapped fluid, particularly when relatively incompressible liquids such as oils are handled. To this end, the aforementioned vents 50 are provided through the pressure plates, and also the vents 53 at the bottom of each carrier forward face, which each open into channels 54 extending lengthwise of the rotor 12. The ends of each channel 54 open to the circular recesses 44 thus providing venting at any position of the rotor. Thus through the series of recesses or vent channels, as the case may be, 53, 54, 44, 45 and through 50, venting for the trapped liquid spaces is provided to the two chambers behind the pressure plates formed by recesses 38 and 39 in the cover plates. These chambers are vented to the high pressure outlet manifold as already described, through vent 46 or through vent 48—49, so that a sufficient back pressure is maintained at the exchange stations to provide a fluid cushion between exchanging rollers.

These systems of venting channels also have the further function of supplying fluid pressure to the outer faces of the pressure plates to produce endwise pressure, additional to that of the compressed O-ring seals, for maintaining the seal of the pressure plates on the ends of the rotor and of the roller cylinders. The recesses 44, by providing a clearance between rotor and pressure plates over the central area where wear is less rapid, also allow the pressure plates to "feed" inwardly to compensate for wear. Various positions and interconnections of the vent channels may of course be used depending upon the fluid handled, the metal distribution in the casing, and the shape of rotor 12 and race 16.

In view of the above described operation, an analysis of rotor and roller track shapes may now be more clearly understood. The fact that the rollers function as mobile seals between rotor and track indicates that curved portions of the roller contact surfaces should be cylindric surfaces, the genetrices of which are parallel to each other and to the axis of the rotor. Here the term cylindric is used in the general geometric sense, not necessarily signifying circularly cylindric. Flat portions of the roller contact surfaces would be similarly generated. Hence the contacts of each roller with the rotor and track surfaces are parallel and, theoretically, line contacts.

The forward face of each carrier, which may be flat, preferably has a backward slope that the roller may move more readily outward in traversing radially outwardly receding portions of the race and thereby maintain the seal. Thus as a roller is advancing, centrifugal force urges the roller outwardly against the race and also the reaction force or back pressure of the fluid being moved wedges the roller between rearwardly converging surface portions of the carrier and the race until the roller escapes the forward carrier face at an exchange station, as is about to occur in the situation of 13d in Fig. 1. To allow such escape, the space between the radial extreme of the carrier and the race must be sufficient to accommodate the roller at the escape point of the exchange station. This is of course a general requirement for similar mechanisms.

The forward part of the exchange station slopes inwardly toward the rotor so that rotor and race provide forwardly convergent surface portions in which a roller may wedge to form a seal as is formed by roller 13b. As a roller is displaced forwardly to escape the exchange station, it must move inwardly relative to the rotor, for which suitable clearance between race and carrier surfaces must be provided. The inlet and outlet ports are so located that between any successive pair, comprising an inlet and an outlet, there is provided at all times at least one roller forming a positive seal.

Figure 4:
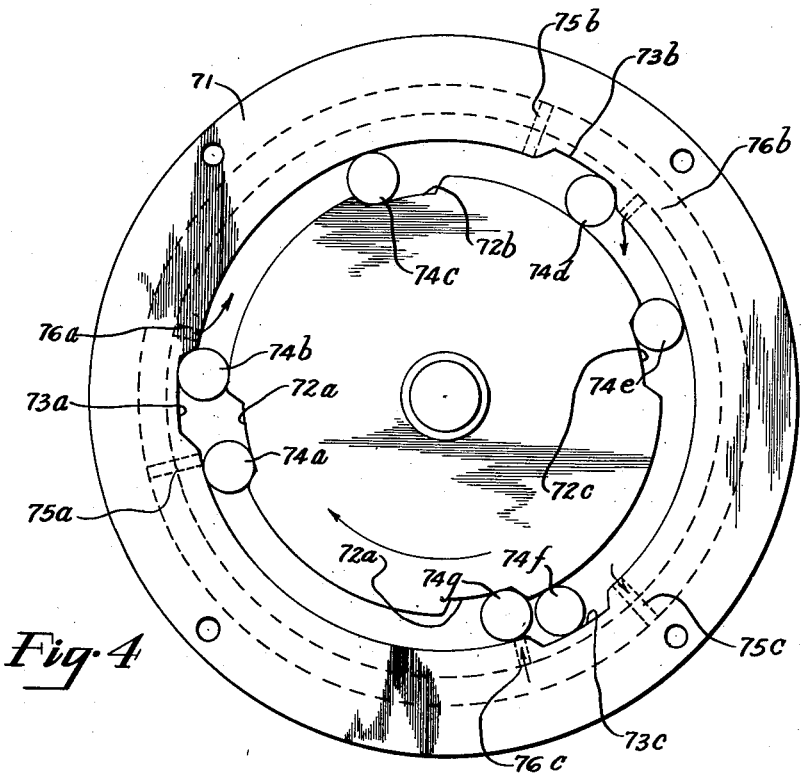
Fig. 4 is a schematic representation of the invention as realized with another form of casing and rotor.

In Fig. 4 there is shown schematically another form of the invention in which the rotor member and outer race member are of generally concentric form. The rotor 70 is provided with four carrier grooves 72a—b—c—d spaced equally about the inner periphery thereof, while the casing 71 has three equally spaced exchange station grooves 73a—b—c. Each groove is of symmetric form, the length of each being dimensioned so that no more than one roller seal may be completely accommodated in each. The shoulders or ends of each groove are sloped to provide wedging action on the seals. The depths of the grooves are dimensioned with respect to the concentric surfaces and the roller diameters so that when the seals are held against the shoulders of the grooves of one member they bear on the concentric surface of the other member. To facilitate escape of rollers from grooves, the shape and height of the shoulders should be such that the line of contact of roller when held against the shoulder is at a height from the groove bottom less than the height of the roller axis from the bottom—that is, the lower the line of contact of shoulder on the roller toward the groove bottom, the more easy the escape during exchange and the stronger the wedging force developing sealing pressure at other times.

About each exchange station 73 a pair of ports 75 and 76 opening through the race face is provided symmetrically disposed with respect to the groove and spaced so that at all times rollers translated by the rotor form seals therebetween. With the symmetrical disposition of the grooves on the respective members, the symmetric form of the grooves and symmetric disposition of the fluid ports about each exchange station groove, the pump is reversible as to direction of flow by simple reversal of the direction of rotation.

As shown in the figure with the spindle rotating clockwise, the pair of rollers 74a and 74b at the exchange station 73a are about to enter the exchange process. The space between the rollers contains compressed fluid since the seal 74a has passed the port 75 serving as an exhaust port. When this form of pump is used for compressible fluids such as air and other gases no vents need be provided and the fluid compressed in the space serves as a cushion to prevent tapping of the rollers and to aid the exchange process. The roller 74c, as it is carried ahead away from the station 73a, is drawing fluid into the expanding space bounded by 74c and 74b through the port 76a from a suitably placed manifold in the casing, while the fluid in front of the roller 74c is being carried forward and expelled through the port 75b. The roller 74d lodged against the forward incline shoulder of the groove 73b provides the seal for the contracting chamber formed with the roller 74c to cause the expulsion of the fluid through the port 76b. The operation in general is similar to that carried on in the pump of Fig. 1.

Figure 5:
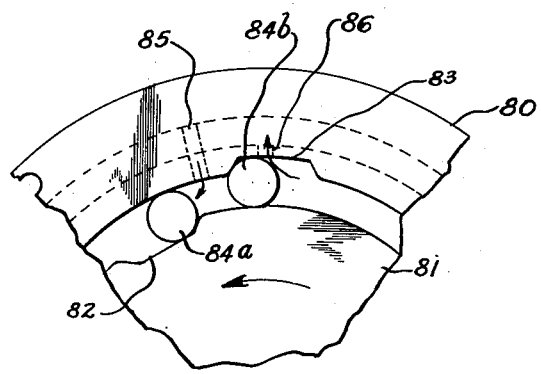
Fig. 5 is a fragmentary view showing another fluid port arrangement in a device of the general form shown in Fig. 4.

In Fig. 5 there is presented a fragmentary view showing another arrangement of the ports with respect to the exchange station, the casing 80, rotor 81 and grooves 82—83 being similar in form to those of Fig. 4, but the exhaust port 86 opens into the bottom face of the exchange or outer race groove 83. With this manner of the disposition of the ports the device is not reversible. The groove 82 on the rotor is carrying the seal 83a in a counter-clockwise direction, thereby drawing liquid through the inlet port 85 into the expanding chamber formed in conjunction with the seal 84b. At the same time another roller (not shown), being carried forward toward the station 83 by another groove on the carrier, forms with roller 84b—a contracting chamber expelling liquid through the exhaust port 86. The main requirement for the positioning of the port 86 is that it be behind the sealing position of the roller 84b to allow unimpeded flow of the exhausted fluid.

As the form of the ports and manifolds in Figs. 4 and 5 may be similar to that of Figs. 1–3, these are not described nor illustrated in detail. Venting systems may be provided as needed, and end plates and end covers of suitable form, e. g. corresponding to those of Fig. 2, may be used. Moreover, in all the foregoing forms, if desired, side pressure plates may be omitted, especially where the pump will not be operated at low speeds, or where leakage is not important, and then cover plates with a close roller end clearance provide the end walls of the fluid working space. Furthermore, in place of pressure plates forming the side walls of the fluid working space, the casing side walls may serve this purpose as in the casing form of Fig. 11 hereinafter described. In such a case, if desired to seal rotor to casing more effectively, a sealing ring may be provided in a groove cut into each casing wall with underlying resilient means to urge the ring toward the side of the rotor.

In Fig. 6 there is shown schematically by a fragmentary view a form of the invention wherein the casing or outer race 90 has gear teeth 91 formed on its outer periphery whereby the casing is driven by a pinion 92, while a central member corresponding in form to the rotor of the previous forms is held stationary. In this case the inlet and outlet ports 96—97 are provided on the stationary central member 94. The exchange station groove 95 on stationary member 94 has the inlet port 96 opening through its rear slope, while the outlet port 97 opens to the race face of the stationary member slightly forward of the exchange station. The exchange station groove 95, carrier groove 98 and the stationary and moving race faces are similar in form to the corresponding parts of Figs. 4 and 5, and the relay or exchange action, sealing and pumping action of the roller seals 99 and 100 are analogous to that already described. With this disposition of the ports a single exchange station may be used on the stationary member 94 with one or more carrier grooves in member 90. A plurality of exchange stations may be used, in which event there must be an equal or greater number of carrier grooves with one roller seal provided for each groove on the two members. The casing and central member, of course, would be modified as known to the art, to extend one end of the central member through one end of the casing with a rotary seal therebetween, in order to allow external connections to the inlet and outlet ports.

Thus far the embodiments of this invention have been described as fluid pumps. However, with suitable port and roller groove arrangements, a fluid actuated motor may be had. For example, assuming the structure similar to Fig. 5 to have but a single groove on the casing, a diametric pair of grooves on the rotor, and the port 86 to be supplied with fluid under pressure and port 85 used as an exhaust port, the rotor 81 would be turned clockwise by fluid pressure acting between stationary seal 84b and moving seals bearing against the clockwise shoulders of grooves on the spindle or rotor. Fluid would exhaust freely through port 85, now serving as an exhaust port. The location of the ports and the dimensions of the seals, grooves, inner and outer race diameters would of course, as in the pumps, be selected so that at least one of the roller seals maintains a seal between the fluid inlet and outlet ports as long as possible to minimize leakage. Where a plurality of exchange stations is provided and there being at least one more carrier groove than exchange stations (as in Fig. 4) a fluid motor with the port arrangement of Fig. 5 would have a positive seal between adjacent inlet and outlet ports at all times.

An internal combustion engine is shown schematically in Fig. 7 utilizing the exchanging seal principle hereinbefore discussed with respect to fluid pumps and motors. The casing 110 and rotor 111 are provided with coaxial race surfaces having each four equally spaced exchange grooves, the exchange grooves 113a—b—c—d and carrier grooves 114a—b—c—d while eight roller type seals are used, one for each groove. Thus with each quarter turn of the rotor four seal exchanges occur simultaneously. The remaining parts are described to correspond to the clockwise driving of the engine as shown in the drawings. Each outer race groove of one diametrically opposite pair, 113b and 113d, is provided near its clockwise edge with a simple firing device comprising an insulated conductor 117 extending through the casing and held flush with the race face by a threaded bushing 118 threaded into the casing. By grounding the casing to one side of an ignition circuit and connecting the ignition wire 119 to the other side of such circuit, means is provided for firing a combustible fuel mixture compressed, for example, between rollers 115c and 115d. The specific ignition system is not described in detail, since a variety known to the art can be utilized. However, a low voltage source could be used, for as a roller passes over and leaves the end of the igniter conductor 117, a spark is produced suitable for igniting the combustible mixture. About each of the other diametrically opposite pair of exchange grooves 113a and 113c, exhaust outlets 121, fuel mixture inlets 123, lubricant injecting channels 124 and lubricant injection pressure tap 125 are disposed. Each fuel inlet 121, which is connected to a fuel mixture injection or carburetion system, opens to the casing race surface on the clockwise side of the corresponding exchange groove, and each exhaust outlet 121 enters the bottom of its groove at a position providing a sealing surface between the exhaust outlet and the fuel mixture inlet against which a roller seal may abut. Hence, for example at 113a, when roller 115a is seated to form a seal against the forward or clockwise edge of the groove, an expanding chamber is formed in conjunction with roller 115b being advanced by the rotor. Since this chamber is sealed from the exhaust ports, fuel mixture is drawn thereinto from inlet 123 as roller 115b advances. As shown in Fig. 7, at one pair of exchange stations (113b and 113d) the forward seals 115d and 115b have been carried by the rotor beyond the ignition point. The fuel compressed between roller pairs 115c—115d and 115g—115h has been ignited and, in expanding against the forward seals 115d and 115g, is driving the rotor in a clockwise direction. Combustion products from a preceding ignition are being expelled through exhaust ports 121 by the rollers 115d and 115h as they are advanced by the rotor. Forward of the other pair of exchange stations the advancing rollers 115b and 115f, which have passed beyond the fuel inlet, are drawing in fuel mixture behind them. As these latter seals advance, fuel mixture taken in during the preceding quarter turn of the rotor is being compressed in the spaces between roller pairs 115b—115c and 115f—115g preparatory to the firing which will occur after the rollers in each of these pairs exchange position.

By means of the channels 124 oil from a suitable reservoir may be injected in measured amounts into the space between rotor and casing to lubricate the moving parts. The periodic pressure differential developed between channel 124 and pressure tap 125 as rollers traverse the intervening space may be used to inject the oil or to actuate an oil injection and measuring device. Since the specific oil feed mechanism is not as such part of this invention it is not shown.

A controlled exhaust port, having a spring biased valve member, for example, may be used to control the exhaust pressure for the maintenance of a compressed gas "cushion" between rollers exchanging at the exhaust station for the avoidance of roller tapping when necessary.

Figure 8:
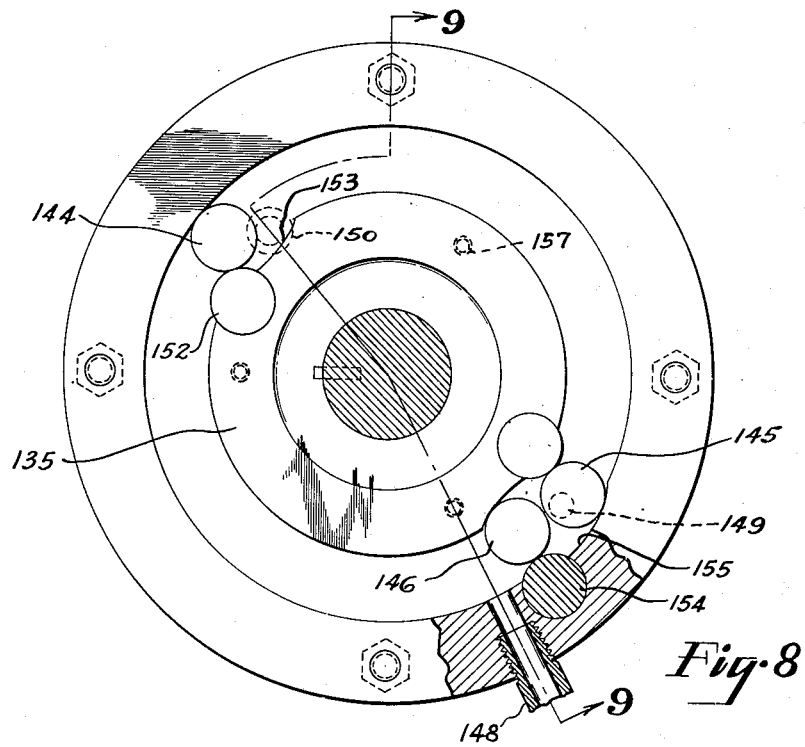
Fig. 8 shows the invention embodied in a pump using roller seals with another rotor and race contour and port disposition, the representation being a section perpendicular to the axis.
Figure 9:
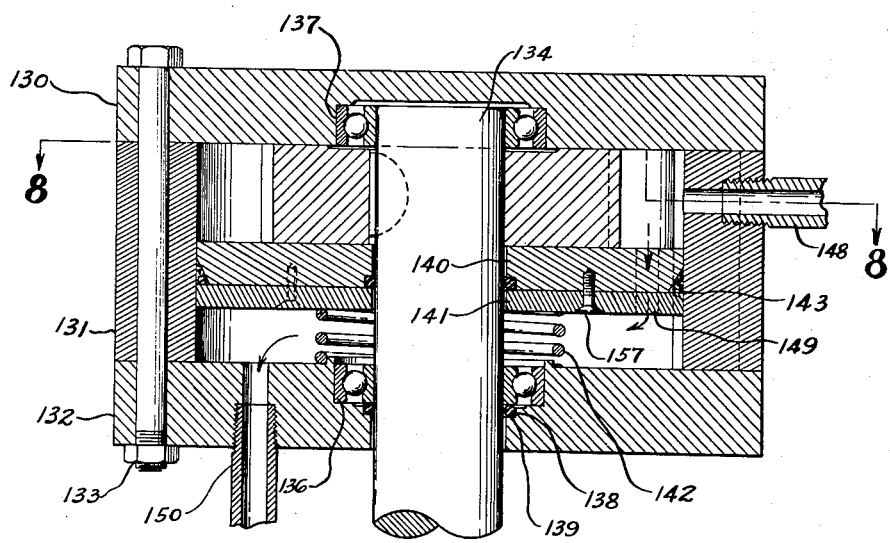
Fig. 9 is a section taken at 9—9 of Fig. 8.

In Figs. 8 and 9 there is shown a device having another form of casing and of exchange station and rotor carrier contour. The casing as shown in Fig. 9 comprises the two side plates 130 and 132, and the annular shell 131 therebetween held together by means of bolts 133. The rotor 135, with cylindrical periphery coaxially disposed with respect to the generally cylindrical inner race face of the casing, is keyed to a shaft 134 journalled in the bearings 136, 137 in the casing side plates. Between the plate 132 and the bearing 136 an O-ring 138 may be provided in plate recess 139 to form a rotary seal between shaft and casing. The axial length of the annular portion of the casing is greater than the axial length of the rotor to accommodate thrust spring 142 and the composite pressure plate comprised of disks 140 and 141 held together by screws 157. The outer edge of disk 140 is beveled to accommodate the packing ring 143 which is forced outwardly by the pressure of the second disk (controlled by screws 157) to form a peripheral seal to the casing. The bearing structure or manner of keying rotor to shaft allows some axial displacement of the rotor whereby spring pressure urges the pressure plate against one face of the rotor and the other face of the rotor against the casing plate 130. The inner portion of each rotor face may be recessed around the shaft similarly to the rotor of Fig. 1 for more even wearing. As shown in Fig. 8, for a clockwise rotating rotor, the exchange station on the casing comprises a recess 155 and a projection, here in the form of a cylindrical pin 154 with axis parallel to the axis of the rotor and with a portion of its cylindrical surface projecting out of the cylindrical face of the outer race. With the periphery of the composite pressure plate recessed and the packing 143 shaped to accommodate the pin 154, rotation of the pressure plate is prevented. The inlet port 148 opens to the threaded inlet in the casing. The outlet port 149, disposed somewhat clockwise beyond the pin in the pressure plate, opens through the space between the pressure plate and the casing to the threaded outlet 150 in the plate 132. The generally cylindrical rotor face has two diametrically disposed carrier structures, each similar in form to the exchange station, comprising pins 152 and recesses 153. Three roller type seals 144, 145, 146 are provided, one for each groove, whereby there is always provided one roller at the exchange station, held from translation by the pin 154 and forming a seal between the casing and the cylindrical rotor face, and two roller seals being advanced by coresponding pins on the rotor.

Thus, one seal 144, as it is carried away from the exchange station by the rotor, draws in fluid behind it through the intake port 148, while the second advancing seal 145, diametrically opposite, is expelling liquid through the outlet port, while fluid taken into the space between the two moving seals during the previous half turn of the rotor is being carried toward the exhaust port. As shown in Fig. 8 a carrier brings a moving seal 145 into the exchange station, the roller end cuts off the outlet port 149 and develops a body of compressed fluid between it and the stationary seal, which forces the latter forward over the pin 154 toward the recess in the rotor as the advancing seal 145, acted on by centrifugal force and fluid pressure, escape over the rotor pin into the exchange recess. The functions of the two seals then become reversed, as is usual in the devices thus far described, the seal which has escaped from the rotor moving forward against the casing pin to form a stationary seal, while the second roller moves backwards against the rotor pin to form a moving seal with the casing. With a pump of this type moving at relatively high speeds, close fitting of the rotor ends and roller sealer ends is not required. As pressure is developed by the pump, a corresponding thrust force is developed on the pressure plate to maintain the end sealing for the fluid working space of the pump. Where non-compressible fluids are to be handled, a venting system may be provided as already described for other devices at the exchange station. However, with compressible fluids, such as gases, this is usually unnecessary and in either event the compressed fluid between a pair of rollers in the exchange process can serve to maintain a roller clearance to obviate tapping of one roller against the other as the exchange is effected.

Figure 11:
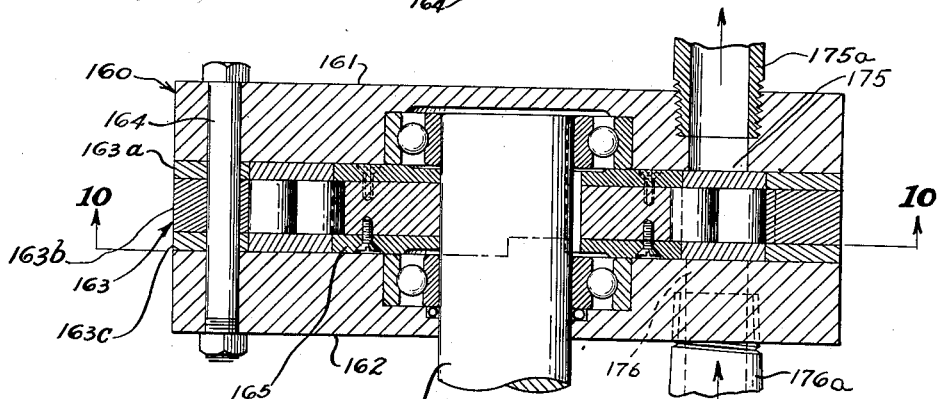
Fig. 11 is a section taken at 11—11 in Fig. 10.

A second form of mobile seal in the form of a sliding block or piston, which is moved in a path entirely circular, is shown in Figs. 10 to 16, Figs. 10 to 15 disclosing the details of a pump using the sliding block, while Fig. 16 shows schematically a structure analogous to Fig. 7 for an internal combustion engine. These sliding pistons or seals are moved in accordance with the relay seal or exchange principle already discussed for roller type seals, although the mobile seals do not deviate from a circular path during the exchange process. In Figs. 10 and 11 there is shown a pump having a casing 160 comprised of the two end plates 161—162, a hollow cylindrical shell 163 held therebetween by bolts 164 and a rotor 165 of generally cylindrical form disposed coaxially to the inner race face of the casing and keyed to shaft 166. The three sliding block seals 168a—b—c, translated about the annular working space between side plates, rotor and casing, each comprise an annular segment having a central radial slot 170 wherein there is disposed a pair of cylindrical rollers 171 radially movable in the slot to provide means for locking the block to carrier grooves 172, 173 or to exchange station groove 174. An exhaust port 175 opens to the annular fluid working space through the side plate 161 of the casing near the counter-clockwise edge of the exchange station, while the inlet port 176 opens similarly through the other side plate 162 at a position somewhat clockwise beyond the other edge of the exchange groove as indicated by the dot and dash circle in Fig. 10.

The sum of the diameters of the rollers is such that it exceeds the radial thickness of the block by about half a roller diameter, while the depth of the carrier grooves 172, 173 diametrically disposed on the rotor and of the single exchange station groove 174 is equal to the distance by which the sum of the roller diameters exceeds the block radial thickness. Thus when a block is being translated by the rotor at a position away from the exchange station, its outermost roller is flush with the outer curved face of the block and is riding the casing race surface, while the innermost roller projecting into a rotor groove is engaged by the groove shoulder. A block at the exchange station, however, has its innermost roller riding the surface of the rotor, with its outermost roller projecting into the exchange groove against a shoulder thereof to lock the block at the exchange station.

The effective length of the grooves is such that when a pair of sliding pistons come into adjacent relation for exchange, rollers from both blocks cannot be fully accommodated in a single groove. Thus as one block, with its rollers pressed downwardly to lock it at a carrier groove of the rotor, is carried into an exchange station, the block locked at the exchange station by an outwardly projecting roller in the exchange station groove is urged forward either by physical contact or by pressure of compressed fluid, whereby its rollers are cammed inwardly by the sloping forward exchange groove shoulder toward the forward end of the carrier groove. At the same time, the rollers of the first block are being cammed upwardly and outwardly on the sloping rear face of the carrier groove toward the rear end of the exchange station groove. As these camming movements of the rollers are completed, the inner roller of the rearward block escapes the carrier groove, moving the outer roller into the exchange groove to lock the block against displacement; while the outer roller of the forward block escapes over the forward shoulder of the exchange groove, releasing the block from the exchange groove and moving its inner roller into the underlying carrier groove to lock the forward block to the rotor. Though the roller pair has been described as moving radially in the slot 170 in consequence of a camming action, it is to be noted that during the exchange process, the pressure of fluid compressed therebetween also acts to displace the rollers radially for release of the blocks, even when the latter do not quite come into contact. Hence, although the manner of locking the mobile seals to carrier or casing is somewhat different from the mechanisms using roller seals, the net result is the same inasmuch as an exchange of mobile seals is effected.

Figs. 12 and 13 are fragmentary views showing details of the construction of the rotor 165 and cylindrical shell 163 respectively, while Figs. 14 and 14a respectively show details of the construction of one of the sliding block type seals 168 and of sealing means 190, which may be desirable in some service conditions for sealing the block faces more effectively to rotor or casing surfaces. Though these figures show the elements 163, 165, 168 as composite structures, each may be of integral construction. The cylindrical shell or annular casing member 163 may comprise two outer annular members 163a, 163c, held by screws 180 to a center member 163b across which the exchange groove 174 was cut before assembly. The rotor 165 may be similarly formed as a composite element comprised of the outer disks 165a, 165c held by screws 181 to a center disk 165 with carrier grooves, as 172, cut into the periphery before assembly of the rotor. The block 168 may be formed of end members 184, between which by screws 183 are held center members 185 in spaced relation to each other to form the roller slot 170. Across the flat end faces and across the inner and outer curved faces of the block are cut respectively the radial and transverse slots 187 and 188 of rectangular cross section. Disposed in each of these slots, as shown more clearly in Fig. 14a, is a sealing bar 190 biased outwardly by the undulant spring member 191. With the structure above described the width of the grooves is sufficient to accommodate the length of the rollers but does not extend the full axial thickness of the blocks, so that entirely around both rotor and casing race face there is provided a continuous bearing surface for the sealing bars 190 positioned transversely across the curved inner and outer faces of the piston blocks. Grooves of other circumferential contour may be used provided the carrier and exchange grooves are shaped to allow the simultaneous oppositely directed movements of the locking devices in an exchanging pair of blocks. In the pump of Figs. 10–11 the sealing bars 190 may be omitted on the sliding piston type seals 168 where the service requirements of the pump do not demand so positive a sealing.

In Fig. 15 several forms of locking devices for the sliding block type seals are disclosed. Thus Fig. 15a shows a pair of rollers such as is used in Figs. 10 to 14; 15b triple-tiered rollers; 15c a tabular shaped pin with semi-cylindrical ends, 15d a cylindrical pin with hemispherical ends, and 15e a pair of ball bearings. With the locking components 15a—c inclusive, carrier and spindle grooves of the general form of those shown in Figs. 12 and 13 would be used, while with locking components of the form of 15d or 15e the grooves preferably would be in the form of channels having semi-circular cross sections, while slot 170 would be replaced by a cylindrical bore. With seals of the piston or sliding block type used in place of roller seals, the inlet and outlet ports would be positioned on the casing at distances sufficient to accommodate the length of the sliding blocks. The variations in numbers of exchange stations, carrier grooves, use or non-use of venting systems or end sealing means for the fluid operating chamber may be such as those already described for the devices embodying roller type seals and, as previously discussed, by proper disposition of the ports a reversible pump or a fluid driven motor may be had.

In Fig. 16 there is represented schematically an internal combustion engine using seals of the sliding piston type. The operation and general disposition of the components of this engine—annular casing member 210, rotor 211, shaft 212, exchange station grooves 213a—d, carrier grooves 214, fuel inlet 223, lubricant injection and pressure channels 224 and 225—are similar to those described with respect to Fig. 7, with sliding piston type mobile seals 268, similar to those of Figs. 10–14, used in place of roller seals. However, because of the considerable length of the outer block face, the spark plugs 217 are threaded into a radial bore in the casing opening into the bottom of each of the diametrically opposite exchange station grooves 213b—213d, while outlet ports 221 open through the end plates of the casing. Though omitted from the drawings for the sake of simplicity, it is to be understood that channels may be provided in the rotor shaft and casing members for the circulation of a coolant in the case of internal combustion engines as shown in Figs. 7 and 16.

For high pressure pumps where the forward retaining shoulder against which a stationary seal seats is preferably steeply inclined to increase the sealing pressure, another form of seal retaining formation may be used in the outer casing to aid in the escape of a seal held stationary therein. Fig. 17 shows such a seal retaining formation having a stationary seal lifter in the form of an arcuate rotatable insert 290 rolling in a semi-circular recess 291 extended across the outer race face. On at least one end of 290 a cylindrical extension 292 co-axial with the recess 291 is journalled in a bore in the casing to allow rotation of the lifter. The roller 295 in seating in the exchange station bears against shoulder 296. When a roller 297 is carried into the exchange station, it bears outwardly against a bearing surface 298 to cause rotation of the lifter in a clockwise direction, thereby lifting the roller 295 slightly to aid its escape over the shoulder 296.

In addition to the free roller and sliding block types of seals hitherto described, other forms may be used which move in the exchange sequence already illustrated. Thus in Figs. 18–20, a casing, comprising the side wall 301, the side wall 302 with integral cylindrical wall 303 held together by bolts 304, encloses a pair of circumferentially flanged disks 306, 307 disposed on either side of rotor disk 308 of which the hub 309, keyed to rotate with shaft 310, extends into central apertures of the seal disks. The shaft 310 may be journalled and sealed to the casing in any suitable manner.

The offset portion 312 of disk 307, from which the annular flange 313 extends, is accommodated in an annular recess 305 in wall 302. Disk 306 is provided with an annular flange 314 spaced from flange 313 and extended to the offset 312 to enclose the rotor and central portion of disk 307. As flange 313 is provided with at least one inwardly extended sealing block 316 affixed to the flange and the offset portion, and disposed in slidable sealing relation to flange 314 and wall 301, and as flange 314 is provided with at least one outwardly extended sealing block 317 in slidable sealing relation to wall 301, flange 313 and offset 312, a plurality of fluid working chambers of operatively variable size are available for utilization in a pump, motor or internal combustion engine by incorporation of auxiliary structures as already discussed for previous devices. Spring biased sealing bars similar to those on the sliding blocks of Figs. 14 and 14a may be used. However, the number of blocks on one seal disk is equal to those on the other, and where a plurality of blocks are used on a disk they are symmetrically spaced.

To lock the seal bearing disks and hence the corresponding seal blocks relative to rotor or casing, the disks are provided with locking devices 319, 320 axially movable in apertures 321, 322 into engagement respectively with casing recesses 323, 324 or with rotor aperture 321. When more than one seal block is provided on each disk, then a corresponding number of locking devices and auxiliary structures must be used. In Figs. 18–19, disk 307 is locked to the casing by 320 seated in recess 324 and disk 306 is locked to the rotor by 319 and is moved therewith causing seal 317 to translate in the annular space toward seal 316. With inlet ports 327 and exhaust port 328 opening through the side wall 301 on opposite sides of the position where the seal blocks stop (position of 316) and with the mechanism operating as a pump, fluid is drawn in through 327 behind a seal block receding from 316, while fluid is expelled through 328 by advancing block 317. The consequent pressure difference between the two sides of the stationary seal block 316 tends to move that seal block and hence the disk 307 in the direction of rotor rotation, with the result that the advance slope of recess 324 tends to cam the lock means 320 toward the rotor. When the rotor aperture 325 comes opposite the disk aperture 322 i. e. the seal carrier and retaining formations are passing or in transit, 320 is allowed to cam into the rotor displacing 319 into the recess 323. This exchange action, which is about to begin in Fig. 20, results in the rotor picking up disk 307 released from the casing and in the release of disk 306 by the rotor to a stationary relation upon engagement by the casing. In other words, after exchange has taken place the conditions shown in Fig. 19 will be reversed, with sealing block 317 stationary at the position formerly occupied by 316, and with 316 advancing.

As shown in the drawings, the locking devices have cylindrical bodies, semi-hemispherical outer ends and slightly convex inward base ends with slightly rounded edges. The length of each locking member should be close to and not exceeding the thickness of rotor disk 308 plus the seal bearing disk thickness, while the contour of each casing recess must be such, first as to allow seating of the locking means at a depth permitting the rotor to escape the inward ends of the locking devices, and secondly, with respect to the corresponding recess on the opposite plate, as to permit a seated locking device to cam out of seated position and into the rotor recess, while simultaneously moving a second locking device out of the rotor aperture into engagement with the recess of the opposite plate. The shape of the inner ends of the locking devices is generally convex to assure release of the rotor. It is to be understood that various shapes of locking members and cooperating locking apertures and recesses may be used, the form shown in Figs. 18–20 being merely one form which might be used. Further, the contour of the locking recesses may be varied to change the degree of approach of one seal to another before exchange is effected.

To supply an axially directed force urging the several disk members together for the purpose of minimizing leakage, a plurality of balls 331, biased outwardly from cavities in the end face of the annular recess 305 by preloaded compression springs 332, bear against the offset portion 312 of disk 307. To supplement the endwise thrust of balls 331, a channel 333 in the casing running from outlet port 328 and opening into annular recess 305, introduces fluid pressure between the disk 307 and wall 302. Thus as outlet pressure is developed tending to spread the disks, a corresponding opposed force is developed.

In utilizing this third seal form, in fluid motors or internal combustion engines, adaptations of the structure of Figs. 18–20 would of course be made analogous to the structures already discussed for roller or free sliding block type seals. Thus for an internal combustion engine, each exchange or seal stop position, which as in Fig. 19 is associated with an inlet and exhaust port, would be followed by a seal exchange position with an associated ignition device and fuel compression space as in Fig. 16. Flange 313 may be omitted so that seal 316 is supported only by offset 312 with the resultant radially outward face of seal 317 in slidable sealing relation to the cylindrical wall 303. With such structure the inlet and exhaust ports may be situated in the cylindrical casing wall.

It is to be understood that various forms and combinations of seals, carrier and exchange station formations, port dispositions, casing and spindle arrangements may be used for fluid pumps, motors or internal combustion engines, depending upon the service or performance requirements which are to be met, which would be within the scope of this invention as embodying the mobile seal relay or exchange principle illustrated hereinbefore.

I claim:

1. A rotary fluid displacement mechanism comprising a fixed member and a member rotatable relative thereto, one of said members being disposed in spaced relation about the other to provide a fluid working space therebetween, members forming side walls for said space, a plurality of mutually displaceable mobile seals in sealing relation to said members, said seals being translatable about said working space, a mobile seal carrier formation on the rotatable member adapted to positively mechanically engage and translate a mobile seal about said space in sealing relation to said members, a mobile seal retaining formation on the fixed member adapted to seat and positively mechanically hold another of said mobile seals from translation while in sealing relation to said members, said formations being shaped with respect to each other and to the mobile seals to permit exchange of seals between the retaining formation and the carrier formation as the carrier formation passes the retaining formation, and a pair of fluid inlet and outlet conduits opening through paired inlet and outlet ports to the said working space, said paired ports being disposed in rotational sense to each side respectively of the seal seating position at said retaining formation.

2. A rotary fluid displacement mechanism comprising a fixed member and a member rotatable relative thereto, one of said members being disposed in spaced relation about the circumference of the other to provide a fluid working space therebetween, members forming side walls for said space, a plurality of mutually displaceable mobile seals in sealing relation to said members, said seals being translatable about said working space, a mobile seal carrier formation on the rotatable member adapted to positively mechanically engage and translate a mobile seal about said space in sealing relation to said members, a mobile seal retaining formation on the fixed member adapted to seat and positively mechanically hold another of said mobile seals from translation while in sealing relation to said members, said formations being shaped with respect to each other and to the mobile seals to permit simultaneous escape of a seal from engagement with the retaining formation into engagement with the carrier formation and of a seal from engagement with the carrier formation into engagement with the retaining formation as the carrier formation passes the retaining formation, and a pair of fluid inlet and outlet conduits opening through paired inlet and outlet ports into the said working space, one of said paired ports being disposed to each side of the seal seating position at said retaining formation.

3. A rotary fluid displacement mechanism having a pair of relatively rotatable members comprising a central member and an outer hollow casing member enclosing said central member with inner peripheral surface spaced about an outer peripheral surface of said central member, said casing member including side wall elements whereby a closed fluid working space is provided about said central member, a plurality of mutually displaceable mobile seals disposed in said space to divide the working space into a plurality of fluid chambers of operatively varying size, a mobile seal carrier formation on the peripheral surface of the rotatable member adapted to positively mechanically engage and translate a mobile seal in sealing relation to said inner and outer peripheral surfaces, a mobile seal exchange station formation in the peripheral surface of the other member adapted to positively mechanically restrain a mobile seal from translation and to hold it in sealing relation to said inner and outer peripheral surfaces, said formations being contoured to allow simultaneously exchange of seals between the carrier formation and exchange station formation as a carrier formation transits an exchange station, and paired fluid inlet and exhaust conduits opening into said space through corresponding ports disposed adjacent to and to either side of said exchange station.

4. A mechanism comprising two spaced relatively rotatable members, means providing a rotary seal between said members and forming therewith a closed path working space between said members, a plurality of mobile seals translatable about said working space and dividing said working space into a plurality of chambers, mobile seal engaging means on each of said members adapted to positively mechanically restrain successive individual seals from translation relative to the corresponding member, seal engaging means on one of said members being adapted to cooperate with seal engaging means on the other said member to effect exchange of engaged mobile seals between said members during relative rotation thereof, whereby the chambers between successive mobile seals are continually varied in size.

5. A mechanical action comprising a rotor member and a stationary member in coaxial relation thereto forming an orbital fluid working space, a plurality of mobile sealing means disposed in sealing relation between said members and dividing said space into chambers, seal carrier means associated with said rotor member adapted to positively mechanically engage and move individual sealing means relative to said stationary member, and seal exchange means associated with said stationary member adapted to positively mechanically engage and retain individual sealing means from movement; said carrier, exchange means and sealing means being mutually adapted in form for exchange of moved and retained seals during transit of carrier means relative to exchange means.

6. A device as described in claim 1 wherein a plurality of mobile seal carrier formations is provided on the said rotatable member, the number of mobile seals being equal to the total number of said seal carrier and seal engaging retaining formations.

7. A device as described in claim 1 wherein a plurality of mobile seal retaining formations is provided on the said fixed member, and seal carrier formations exceeding the number of said retaining formations, the number of mobile seals being equal to the total number of said seal carrier and seal retaining formations.

8. A rotary fluid displacement mechanism having a pair of relatively rotatable members comprising a cylindrical central member and a hollow casing member enclosing said central member with an inner cylindrical surface spaced about the cylindrical surface of said central member, said casing member including side walls whereby a closed fluid working space is provided about the periphery of said central member, a plurality of mutually displaceable mobile seals disposed in said space to divide the working space into a plurality of fluid chambers of operatively varying size, a mobile seal carrier formation on the peripheral surface of the rotatable member adapted to positively mechanically engage and translate a mobile seal in sealing relation to said cylindrical surfaces, a mobile seal exchange station formation in the surface of the other member adapted to hold positively and mechanically a mobile seal from translation and in sealing relation to said inner and outer cylindrical surfaces, said formations being contoured to allow simultaneous exchange of seals between the carrier formation and exchange station formation as a carrier formation transits an exchange station, and fluid inlet and exhaust conduits opening into said space through paired inlet and exhaust ports disposed respectively at either side of said exchange station.

9. A device as described in claim 6 wherein mobile seals are provided in the form of rollers.

10. A device as described in claim 6 wherein each of said formations comprises a groove provided with a seal engaging shoulder; and wherein each said mobile seal comprises a sliding block in the form of an annular sector having therethrough a radial aperture and locking means extended the length of said aperture and projecting therefrom, said locking means being radially movable in one direction into engagement with a shoulder of a carrier formation and in the opposite direction into engagement with a shoulder of a seal engaging formation.

11. A device as described in claim 2 wherein one of said side wall elements is biased against said central member to provide sealing pressure on the end of said central member.

12. A rotary pump mechanism having a pair of relatively rotatable members comprising a rotor member and a hollow casing member enclosing said rotor member with inner peripheral surface spaced about an outer peripheral surface of said rotor member, said casing member including side walls whereby a closed fluid working space is provided about the circumference of said rotor member, a plurality of mutually displaceable mobile seals disposed in said space to divide the working space into a plurality of fluid chambers of operatively varying size, a mobile seal carrier formation on the peripheral surface of the rotor member adapted to positively mechanically engage and translate a mobile seal in sealing relation to said inner and outer peripheral surfaces, a mobile seal exchange station formation in the peripheral surface of the casing member adapted to positively mechanically restrain a mobile seal from translation and in sealing relation to said inner and outer peripheral surfaces, said formations being contoured relative to each other and to said seals to allow simultaneous exchange of seals between the carrier formation and exchange station formation as a carrier formation transits an exchange station, and fluid inlet and exhaust conduits opening into said space through paired inlet and exhaust ports disposed respectively at either side of said exchange station.

13. An internal combustion engine having a mechanism as described in claim 2, wherein there is provided an even number of said mobile seal retaining formations and a number of carrier formations at least equal to the number of said seal retaining formations, each said formation having a forward and a rear seal engaging shoulder; and paired fuel intake and exhaust ports and fuel igniting means in said fixed member alternately associated with successive seal retaining formations, the paired inlet and outlet ports being disposed respectively toward the rotationwise and anti-rotationwise sides of the mobile seal seating position of a corresponding seal retaining formation and said igniting means being disposed rotationwise of the rear seal engaging shoulder of a corresponding seal retaining formation.

14. A device as described in claim 1 wherein the seal carrier formations exceed the number of said retaining formations, the number of mobile seals being equal to the total number of said seal carrier and seal retaining formations.

15. A device as described in claim 1 wherein each of said formations comprises a groove provided with a seal engaging shoulder; and wherein each said mobile seal includes a sliding block in the form of an annular sector, said seal having therethrough an aperture and locking means extended the length of said aperture and projecting therefrom, said locking means being movable in one direction into engagement with a shoulder of a carrier formation and in the opposite direction into engagement with a shoulder of a seal retaining formation.

16. A rotary fluid displacement mechanism comprising a fixed casing member and a member rotatable relative thereto, said members being shaped and disposed relative to each other to provide an annular fluid working space; a plurality of mutually displaceable mobile seal means in sealing relation to said members, said seal means providing radially extending walls orbitally movable about said working space for dividing the space into chambers of operatively varying size; mobile seal means carrier and retaining formations on the rotatable and fixed members respectively, adapted respectively to positively mechanically engage and move a mobile seal means about said space in sealing relation to said members and to engage and mechanically hold another of said mobile seal means from movement while in sealing relation to said members whereby the wall provided by a seal means being held is maintained in a fixed position relative to the said fixed member, said formations being shaped with respect to each other and to the mobile seal means to permit exchange of engaged seal means between the retaining and the carrier formations during relative transit of the formations; and a pair of fluid inlet and outlet conduits in the fixed casing member opening through paired inlet and outlet ports to the said working space, said paired ports being disposed in rotational sense to each side of the said fixed position.

17. A mechanism as described in claim 16 wherein each said mobile seal means includes a movable locking element engageable by said formations, said locking element being movable by a camming action of a retaining formation from engagement with that retaining formation into engagement with a carrier formation transiting thereby.

HAROLD A. GRAHAM.

References Cited in the file of this patent
UNITED STATES PATENTS

| Number | Name | Date |
|---|---|---|
| 1,307,210 | Newcomb | June 17, 1919 |